US008323473B2

(12) United States Patent
Luo et al.

(10) Patent No.: US 8,323,473 B2
(45) Date of Patent: Dec. 4, 2012

(54) METHODS AND SYSTEMS FOR MONITORING AND CONTROLLING ELECTROEROSION

(75) Inventors: Yuanfeng Luo, Shanghai (CN); Renwei Yuan, Shanghai (CN); Kelvin Junwen Wang, Shanghai (CN); Bin Wei, Mechanicville, NY (US); Michael Scott Lamphere, Hooksett, NH (US)

(73) Assignee: General Electric Company, Niskayuna, NY (US)

( * ) Notice: Subject to any disclaimer, the term of this patent is extended or adjusted under 35 U.S.C. 154(b) by 2736 days.

(21) Appl. No.: 10/996,218

(22) Filed: Nov. 23, 2004

(65) Prior Publication Data

US 2006/0108328 A1    May 25, 2006

(51) Int. Cl.
B23H 5/00 (2006.01)
B23H 7/06 (2006.01)
B23H 7/18 (2006.01)

(52) U.S. Cl. ............... 205/640; 205/643; 205/646
(58) Field of Classification Search ............... 205/643, 205/640, 646
See application file for complete search history.

(56) References Cited

U.S. PATENT DOCUMENTS

| | | | |
|---|---|---|---|
| 3,859,186 A * | 1/1975 | Ullmann et al. | 205/643 |
| 3,997,753 A | 12/1976 | Inoue | |
| 4,634,827 A | 1/1987 | Syria et al. | |
| 4,703,144 A | 10/1987 | Goto et al. | |
| 4,731,514 A | 3/1988 | Naotake et al. | |
| 5,122,630 A | 6/1992 | Reynier et al. | |
| 5,453,593 A | 9/1995 | Seok-Yong et al. | |
| 5,872,347 A | 2/1999 | Li et al. | |
| 6,562,227 B2 | 5/2003 | Lamphere et al. | |

FOREIGN PATENT DOCUMENTS

| | | |
|---|---|---|
| EP | 0 009 928 | 6/1983 |
| EP | 0383370 A1 | 8/1990 |
| EP | 0 649 696 | 10/1997 |
| EP | 0 812 643 | 7/2003 |
| EP | 1462202 A1 | 9/2004 |
| JP | 54159795 A | 12/1979 |
| JP | 61-044529 A | 3/1986 |
| JP | 05-293714 A | 11/1993 |

OTHER PUBLICATIONS

A. Behrens, et al, "Threshold Technology and its application for GAP Status Detection".

(Continued)

*Primary Examiner* — Harry D Wilkins, III
*Assistant Examiner* — Zulmariam Mendez
(74) *Attorney, Agent, or Firm* — Penny A. Clarke

(57) ABSTRACT

A method for monitoring machining in an electroerosion assembly having a power supply and an electrode arranged across a gap from a workpiece, includes measuring a voltage at a point in a voltage waveform after a time delay $t_d$ of one half of a pulse width of the voltage waveform. The measurements are repeated for multiple pulses of the voltage waveform to obtain multiple voltages, each of the voltages corresponding to a point in respective pulses. The voltages are averaged to obtain an average voltage, which is compared with at least one threshold voltage, to determine whether the machining is in control. A control signal is generated if the comparison indicates that the process is not in control, the control signal being configured to regulate an operating parameter of the power supply, and the control signal is supplied to the power supply, if generated.

13 Claims, 7 Drawing Sheets

OTHER PUBLICATIONS

A. Behrens, et al, "Neuro-fuzzy Process Control System for Sinking EDM", 2003, Journal of Manufacturing Processes, vol. 5. No. 1, pp. 33-39.
Abstract of JP61-044529, Mar. 4, 1986.
Abstract of JP05-293714, Nov. 9, 1993.
Search Report and Written Opinion from corresponding EP Application No. 05256996.9-1262 dated Feb. 3, 2012.

* cited by examiner

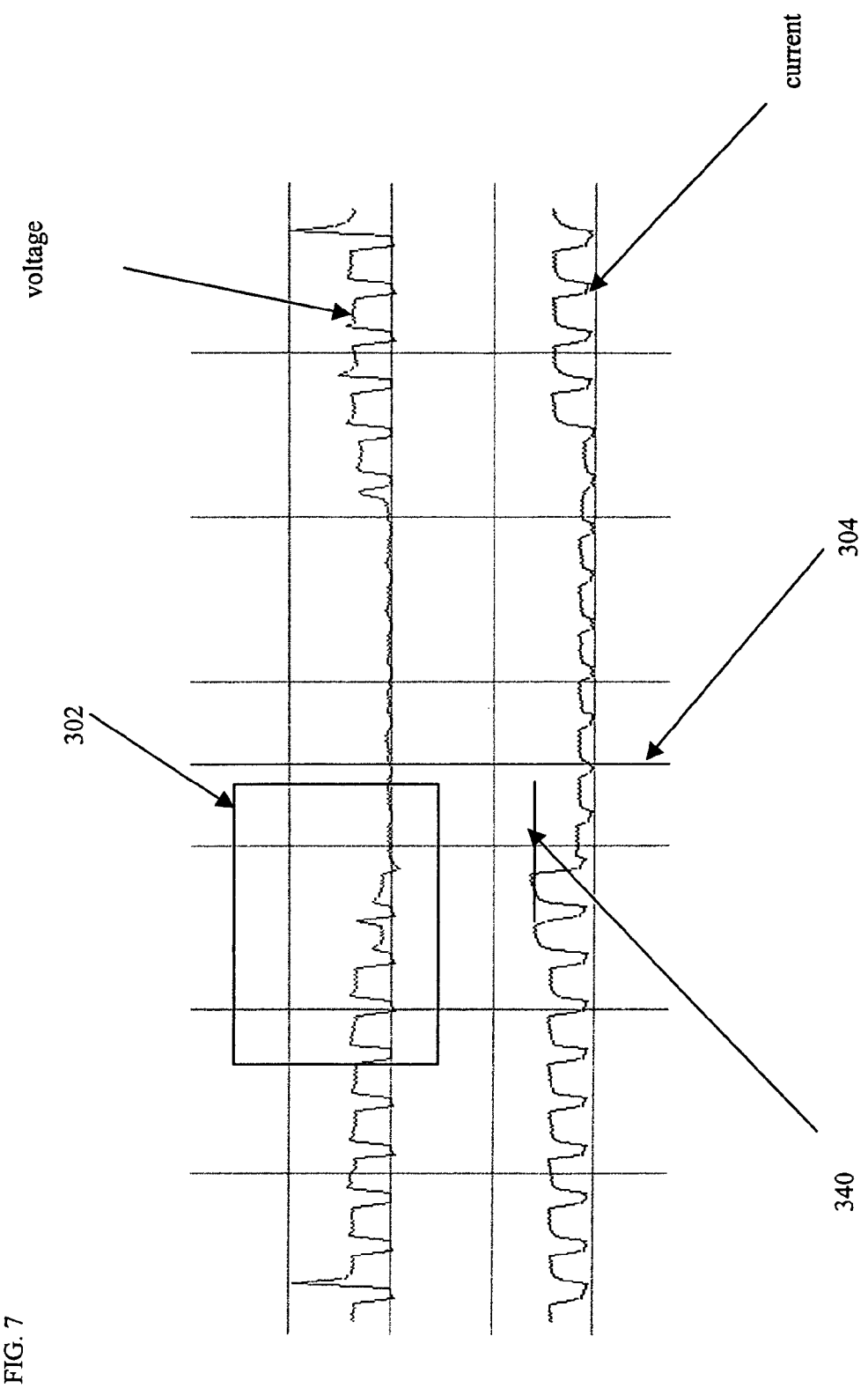

METHODS AND SYSTEMS FOR MONITORING AND CONTROLLING ELECTROEROSION

BACKGROUND

The present invention relates in general to electroerosion, and more specifically to systems and methods for monitoring and controlling an electroerosion process.

Electrochemical machining (ECM) and electrical discharge machining (EDM) are conventional processes for machining material in objects such as gas turbine components. ECM processes typically pass an electrical current in the gap between an electrode(s) and a workpiece for precision removal of amounts of material on the workpiece to achieve a desired final configuration thereof with substantially smooth surfaces. EDM processes circulate a dielectric liquid between an electrode(s) and a workpiece, and electrical discharges are generated in the gap between the electrode and the workpiece. EDM is used, for example, to drill small film cooling holes through the surfaces of turbine rotor blades and nozzle vanes.

Both ECM and EDM processes use electrical current under direct-current (DC) voltage to electrically power removal of the material from the workpiece. However, in ECM an electrolyte (an electrically conductive liquid) is circulated between the electrode(s) and the workpiece for permitting electrochemical dissolution of the workpiece material, as well as cooling and flushing the gap region therebetween. In contrast, EDM processes circulate a nonconductive (dielectric) liquid in the gap to permit electrical discharges in the gap for removing the workpiece material. As used herein, the term "electroerosion" should be understood to apply to those electromachining processes that circulate an electrolyte (electrically conductive liquid) in the gap between the electrode(s) and the workpiece, these processes enabling a high rate of material removal and reducing thermal damages to the workpiece.

Beneficially, electroerosion processes provide for quicker machining and have higher efficiencies as compared to other electromachining methods in various applications, such as, blisk roughing and machining, for example. Typically, in processes utilizing an electroerosion assembly, a voltage potential is generated across a gap between an electrode and a workpiece to be machined, resulting in an electrical discharge in the gap. According to physics of the electroerosion process, when the machining electrode (cathode) approaches the workpiece (anode) surface separated by the gap, an electrical discharge occurs through the gap due to the voltage across the electrode and the anode workpiece. The gap, which constitutes a machining zone, is filled with a liquid electrolyte medium with moderate to low electrical conductivity, and the gap allows for the flow of electrolyte, which removes eroded particles from the gap in addition to providing a suitable medium for electrical discharge or sparking for electroerosion. A "normal" electrical discharge across the gap results in desirable machining of the workpiece. An "abnormal" discharge on the other hand results in undesirable errors in machining which may have a direct repercussion on the surface finish of the machined workpiece. In some cases, the workpiece or the electroerosion assembly may be damaged due to short-circuiting because of a lack of an effective control.

Such errors can be avoided by timely and accurately monitoring of discharge patterns, detecting abnormal discharges and accordingly taking corrective measures. However, the systems currently employed in EDM for monitoring discharge patterns are generally insufficient and/or unsuitable for monitoring electroerosion processes and typically generate errors in detecting a discharge type. The errors may amount to incorrectly classifying normal discharges as abnormal and vice versa, which makes the electroerosion process susceptible to the risks mentioned above. For example, many conventional EDM assemblies employ an ignition delay detection method to determine whether a discharge is normal or abnormal. In the ignition delay detection method, discharges with an ignition delay are considered normal, whereas those without an ignition delay are considered abnormal. However, as noted above, electroerosion processes use electrolytes instead of the dielectric liquids used for typical EDM processes. Accordingly, for electroerosion processes, a number of the pulses without ignition delay are normal discharges, and the conventional ignition delay detection method improperly classifies many normal discharges as abnormal, when used to monitor electroerosion processes.

Accordingly, there exists a need for accurate detection and classification of voltage discharge in electroerosion processes. Consequently, electroerosion processes and systems with accurate monitoring and control are also desired.

BRIEF DESCRIPTION

An aspect of the present invention resides in a method for monitoring machining in an electroerosion assembly having a power supply and an electrode arranged across a gap from a workpiece. The power supply energizes the electrode by applying a potential difference between the electrode and the workpiece during multiple pulse-on periods. The method includes measuring a voltage at a point in a voltage waveform after a time delay $t_d$ of one half of a pulse width $\Delta\tau$ of the voltage waveform. The measurements are repeated for multiple pulses of the voltage waveform to obtain multiple voltages, each of the voltages corresponding to a point in respective pulses. The voltages are then averaged to obtain an average voltage, and the average voltage is compared with at least one threshold voltage $V_{th}$, to determine whether the machining is in control. A control signal is generated if the comparison indicates that the process is not in control, the control signal being configured to regulate an operating parameter of the power supply, and the control signal is supplied to the power supply, if generated.

Another aspect of the invention resides in another method for monitoring machining in an electroerosion assembly having a power supply and an electrode arranged across a gap from a workpiece. A voltage is measured at a point in a voltage waveform after a time delay $t_d$ of one half of a pulse width $\Delta\tau$ of the voltage waveform. The measurement is repeated for multiple pulses of the voltage waveform to obtain multiple voltages, each of the voltages corresponding to a point in respective pulses, the pulses corresponding to a window. The voltages are compared with a threshold voltage $V_{th}$ to classify the pulses as a normal or an abnormal discharge pulse. A control signal is generated if the comparison indicates that a predetermined number of abnormal discharge pulses are present in the window. The control signal is configured to regulate an operating parameter of the power supply, and is supplied to the power supply, if generated.

Another aspect of the inventions resides in an electroerosion assembly including an electrode configured to machine a workpiece, located across a gap from the electrode. The machining is achieved upon application of a potential difference across the electrode and the workpiece. A power supply is configured to energize the electrode is also included in the electroerosion assembly that further includes a controller configured to measure a voltage at a point in a voltage waveform after a specified time delay $t_d$ of one half of a pulse width $\Delta\tau$ of the voltage waveform. The controller is also configured to repeat the measurement for multiple pulses to obtain multiple voltages, each of the voltages corresponding to a point in respective pulses. The controller then compares the voltages with a threshold voltage $V_{th}$, to determine whether a machining process is in control. The controller generates a control signal if the comparison indicates that the machining process is not in control, the control signal, being configured to regulate an operating parameter the power supply, and supplies the control signal to the power supply, if generated.

DRAWINGS

These and other features, aspects, and advantages of the present invention will become better understood when the following detailed description is read with reference to the accompanying drawings in which like characters represent like parts throughout the drawings, wherein:

FIG. 7 is a waveform illustrating yet another example of an applied control signal.

DETAILED DESCRIPTION

Figure 1:
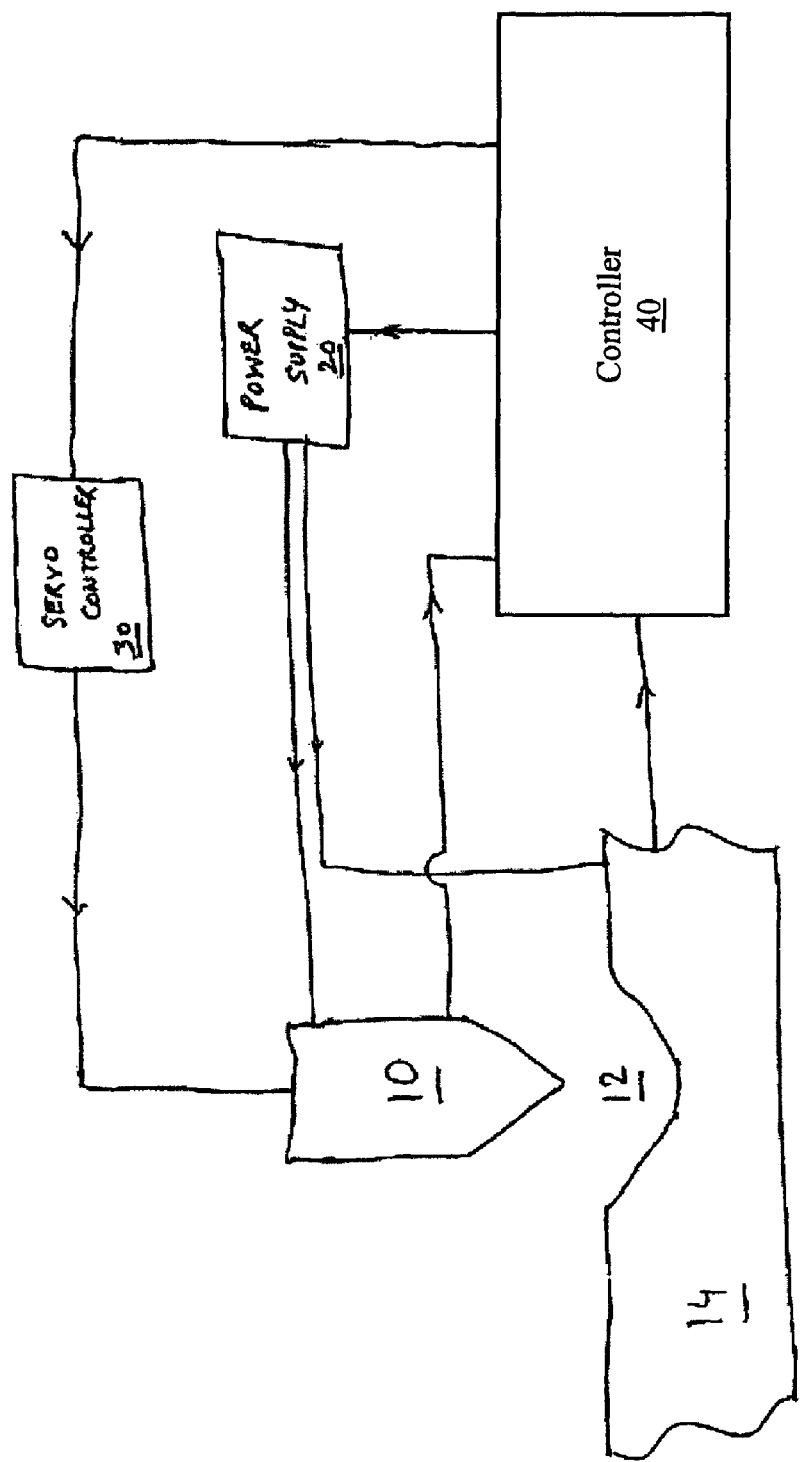
FIG. 1 is a schematic illustration of an electroerosion assembly, according to an embodiment of the invention.

FIG. 1 illustrates an electroerosion assembly 100 according to an embodiment of the invention. The electroerosion assembly 100 includes an electrode 10 configured for machining, arranged across a gap 12 from a workpiece 14 to be machined. The gap 12 and at least a portion of the electrode and the workpiece are submerged in an electrolyte medium (not shown in the figures). A power supply 20 is configured for generating electric discharges that machine the workpiece. Typically, the discharges cause particles at a machining site of the workpiece to separate from the workpiece, thereby machining the workpiece 14. The power supply 20 energizes the electrode 10 by applying pulses of a potential difference $\Delta V$ to generate such discharges, in the gap 12 across the electrode 10 and the workpiece 14. The multiple applied pulses having a pulse width $\Delta\tau$ result in an applied voltage waveform having multiple pulse-on and pulse-off states. In response to the applied voltage waveform, the discharges in the gap 12 generate a voltage waveform that represents the voltage in the gap 12, and the voltage waveform comprises multiple discharge pulses. It is appreciated that the applied waveform (having applied pulses) and the voltage waveform (having discharge pulses, or "pulses") are distinct. A servo controller 30 is provided for controlling mechanical movements in the assembly 100, including controlling the gap 12, the relative movement of the electrode 10 and the workpiece 14 for alignment. A controller 40 is provided for monitoring and controlling electroerosion processes or machining using the electroerosion assembly 100. The controller 40 is coupled to the power supply 20, the servo controller 30, the electrode 12 and the workpiece 14.

The controller 40 is generally configured to, among other functions, direct the power supply 20 to apply pulses of potential difference $\Delta V$ between the electrode 10 and the workpiece 14, measure a voltage across the gap 12, generate selectable time intervals, initiate the measurement after the passage of an interval of time (or a time delay), average voltage values, compare voltage values, and generate control signals to regulate the power supply 20.

The controller 40 may include, without limitation, a microprocessor or another computational device, a voltage measurement device, a timing device, a pulse generation device, a voltage comparison device, a data storage device, among others. All such devices are well known in the art and any such suitable device may be used without deviating from the scope of the invention.

Figure 2:
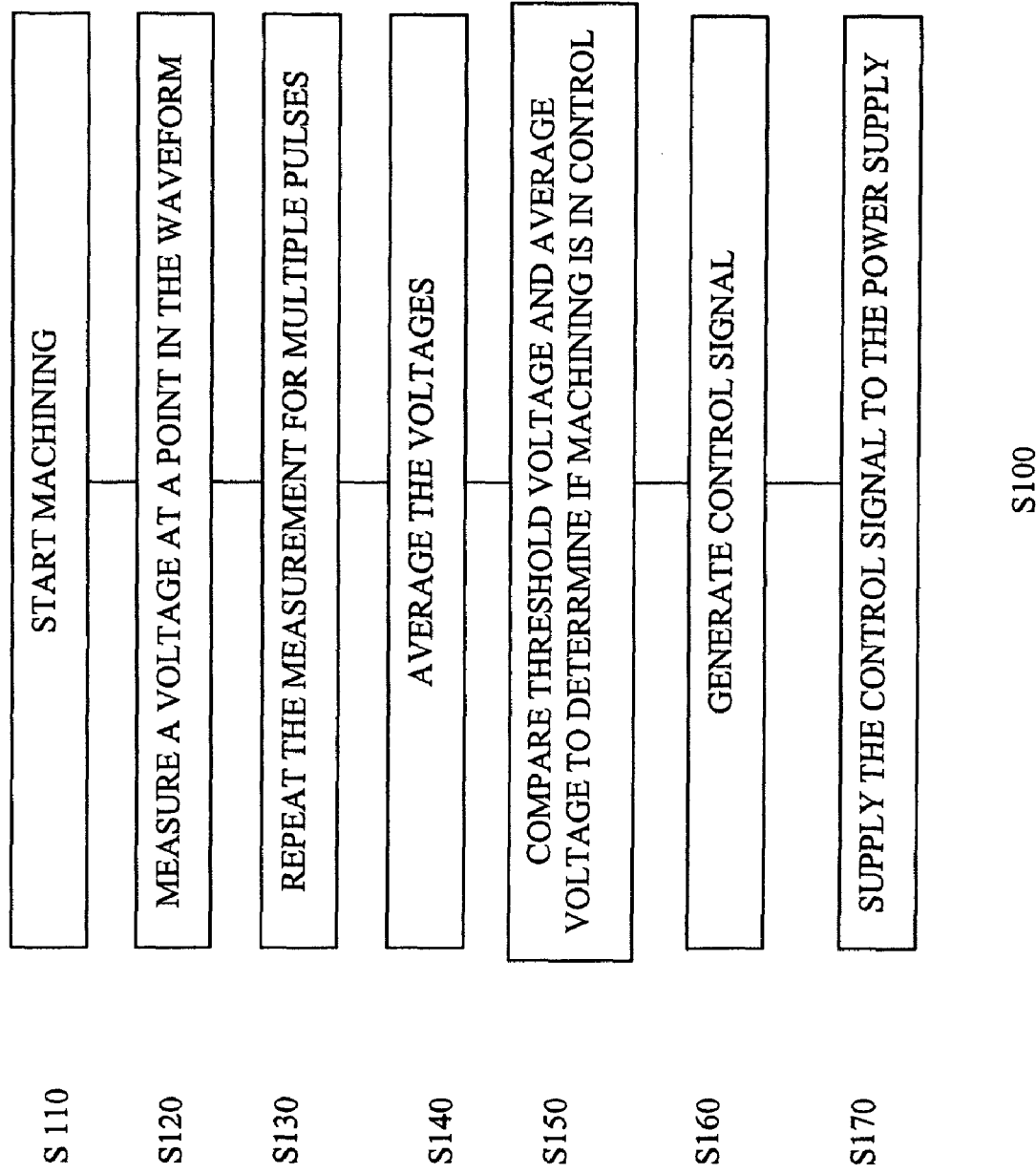
FIG. 2 illustrates a flow diagram of a method for monitoring and control machining using the electroerosion assembly.

FIG. 2 illustrates a method for monitoring machining in the electroerosion assembly 100, according to an embodiment of the invention. According to the method S100, after starting (S110) the machining, a voltage is measured (S120) at a point after a specified time delay $t_d$, of at least half the applied pulse width $\Delta\tau$ from a pulse-on state of an applied pulse of the applied voltage waveform. The time delay $t_d$ may be varied, for example, to two-thirds of the applied pulse width $\Delta\tau$, and such variations are included within the scope of the present invention. The measurement of the voltage as above is repeated (S130) for multiple pulses of the voltage waveform, each measurement being completed after a specified time delay from a pulse-on state of applied pulses of the applied waveform. The number of multiple voltage measurements may be set to a predetermined number, such as four (4) voltage measurements, for example. The multiple voltages, so measured, are averaged (S140) to obtain an average voltage, $V_{avg}$. The average voltage $V_{avg}$ is then compared (S150) to a threshold voltage $V_{th}$ to determine whether the machining is in control. In an embodiment, the determination includes indicating the machining is "not in control" if $V_{avg}$ is less than $V_{th}$. If the machining is indicated as being "not in control," a control signal is generated (S160) to regulate at least one operating parameter of the power supply 20. Operating parameters of the power supply include durations of pulse-on or pulse-off states of the applied pulses, voltage of the applied pulses, current supplied in the applied pulses, among others. The control signal, if generated, is supplied (S170) to the power supply.

It is appreciated that the averaging may be done using any of the various averaging techniques including, but not limited to, simple averaging, point-by-point averaging among others. For example, a predetermined number of voltage measurements as above may be repeated, and these measurements may be averaged. A predetermined interval, which interval may include a number of pulses is referred to as a window (also indicated by numeral 302 in FIGS. 5-7). In one example, the window corresponds to six (6) pulses and thus to an interval equal to six (6) applied pulse widths (6*$\Delta\tau$). This example is illustrative, and the invention is not limited to a window corresponding to any specific number of pulses. In another embodiment, the window is a flying window, which is a variable interval configured to include a variable number of pulses. The flying window advantageously allows for a flexible monitoring of the process, by increasing or decreasing the number of pulses measured.

Figure 5:
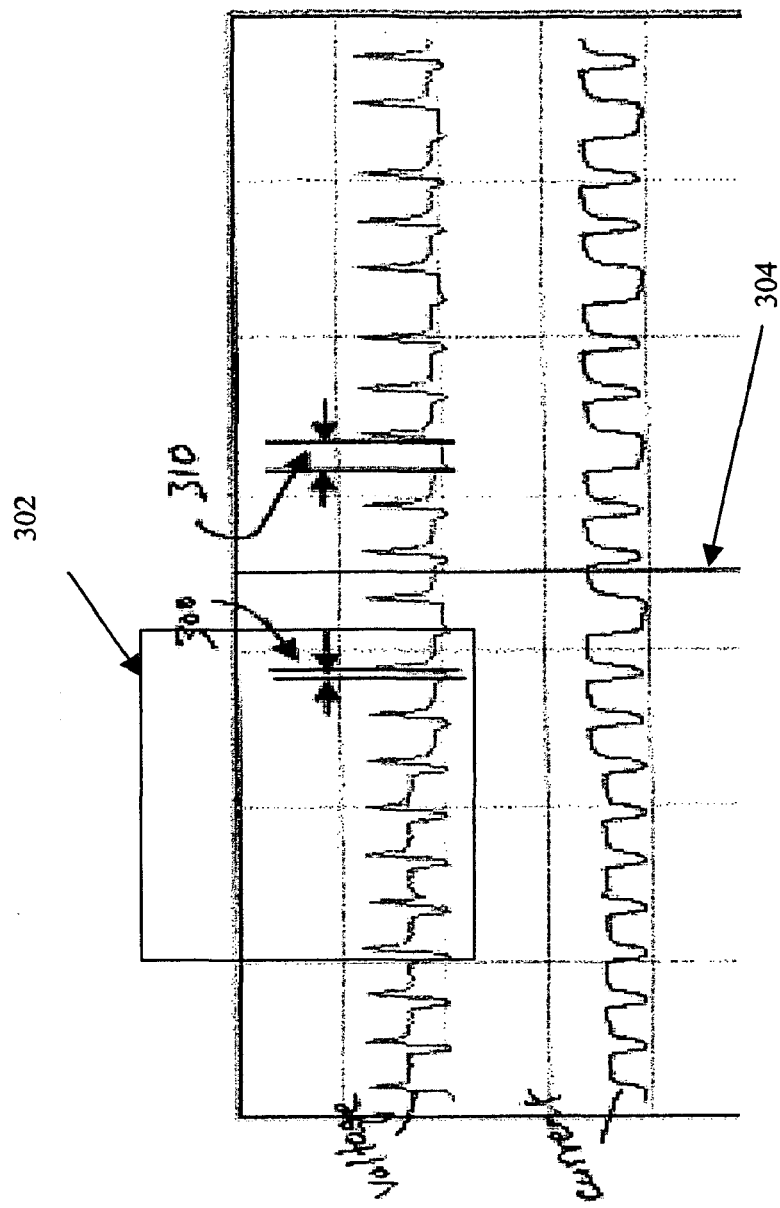
FIG. 5 is a waveform illustrating an example of an applied control signal.
Figure 6:
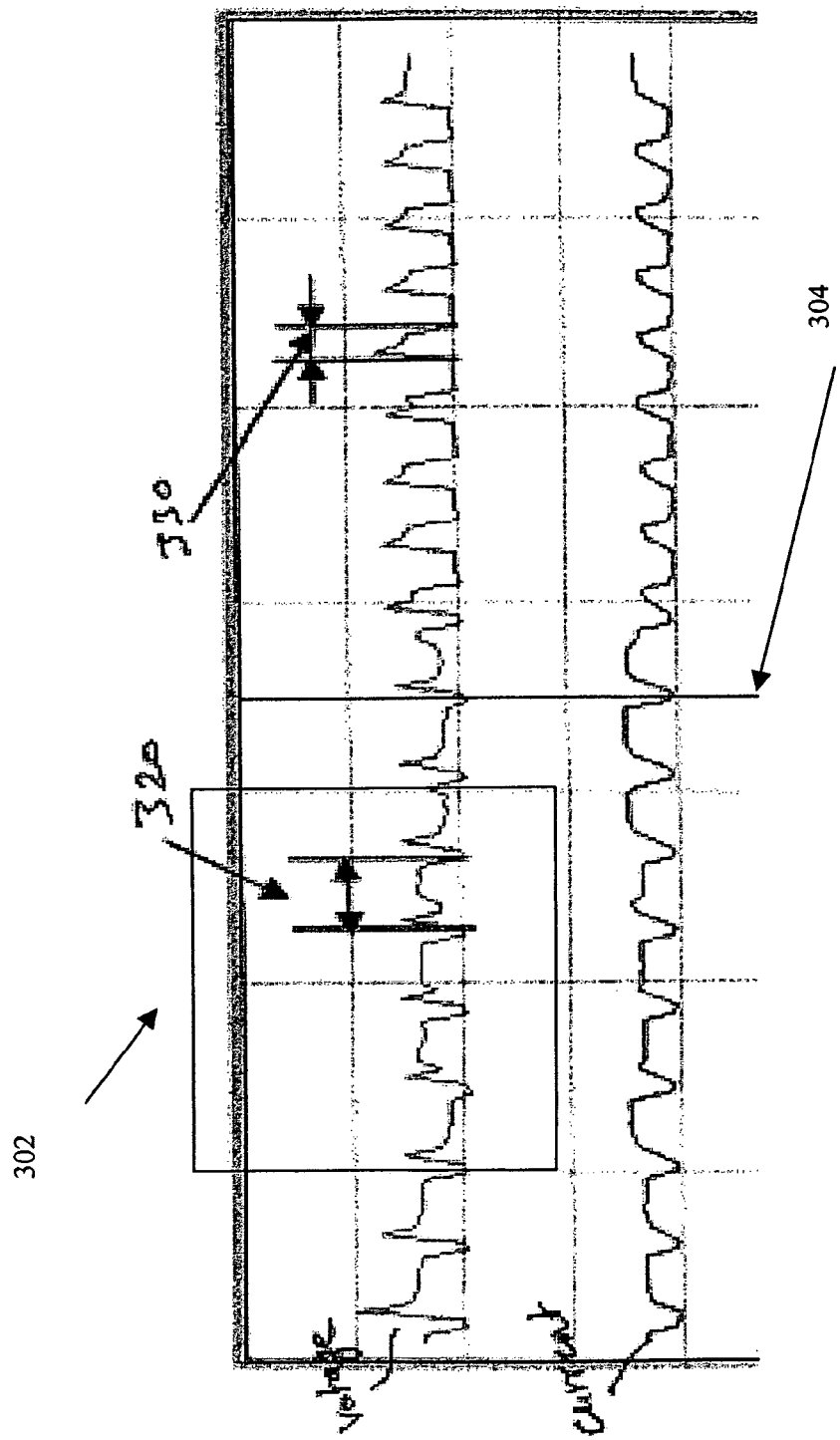
FIG. 6 is a waveform illustrating another example of an applied control signal.

The control signal may be configured to regulate the power supply 20 in a number of ways. According to one embodiment as illustrated by FIG. 5, the control signal instructs the power supply 20 to increase a duration of a pulse-off period 300 between applied pulses to a longer duration of pulse-off period 310. An instance 304 denotes a time at which the control signal is supplied, and similar instances are also indicated for the FIGS. 6 and 7 respectively. In the embodiment of FIG. 5, the control signal supplied at the instance 304, and the control signal is illustrated as causing the pulse-off period duration 300 between two simultaneous pulses, before the control signal was supplied, to be increased to a longer pulse-off period duration 310, after the control signal was supplied. According to another embodiment as illustrated by FIG. 6, the control signal instructs the power supply 20 to decrease the duration of a pulse-on period 320 of the applied pulses to a decreased duration of pulse-on period 330. According to yet another embodiment illustrated by FIG. 7, the control signal instructs the power supply 20 to modify peak current density supplied to the electroerosion assembly 100. The modification includes decreasing the peak current density supplied to the machining site when the peak current reaches a peak current threshold limit indicated by the numeral 340. The values of various pulse-on or pulse-off durations, threshold limits, as discussed may be modified as per specific machining conditions and desired machining quality, among other parameters. Various such values will readily occur to those skilled in the art and are included within the scope and spirit of the invention.

Advantageously, these techniques assist in restoring the machining process to a normal condition, and also decrease the energy supply to the machining site thereby minimizing the damage to the electrode and workpiece. According to a yet another embodiment, the control signal instructs the power supply 20 to turn off when the machining process is out of control. It is appreciated here that any one of the strategies as above, alternate strategies, or various combinations of the above strategies may be employed, by configuring the control signal appropriately.

At certain instances, the machining process may go "out of control," which may mean a continued occurrence of "not in control" discharges that do not resume to a normal condition even after applying a control. Such "out of control" instances may occur for example, on electrode distortion, cyclic arcing, bad electrolyte flushing conditions, incorrigible arcing due to electrolyte shortage, among others. Such instances may also be controlled by the strategies as discussed above, for example, by turning off the power supply. The machining may then be resumed after an appropriate interval of time, or after another suitable remedial action has been taken.

Figure 4:
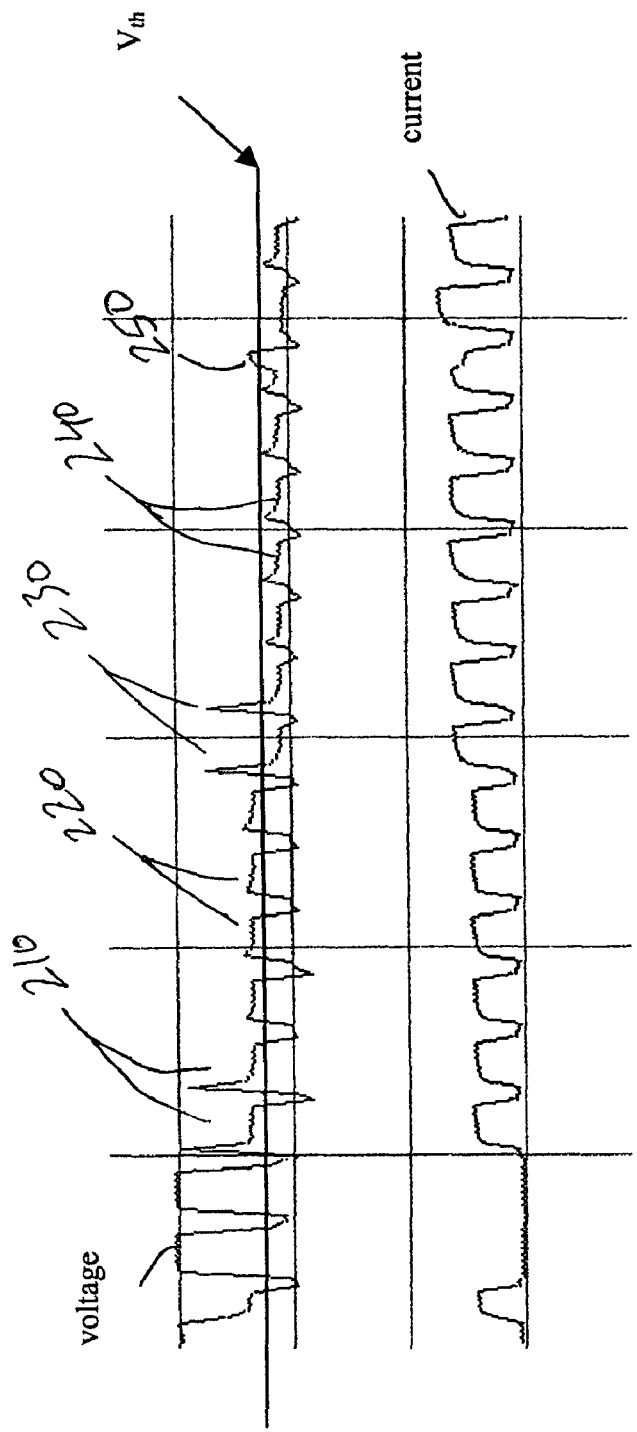
FIG. 4 is a plot illustration characterizing various types of discharges in machining using an electroerosion assembly.

It is further noted that the discharge pulses may be classified as normal or abnormal to indicate the normalcy of the discharge. The two categories "normal" and "abnormal" correspond to desirable and undesirable machining performance, respectively. In certain instances, multiple closely spaced abnormal discharge pulses may correspond to a "not in control" process. In certain other cases, multiple continuous abnormal discharge pulses may correspond to an "out of control" process. Under normal machining conditions, the number of normal pulses is substantially greater than the number of abnormal pulses. In a normal discharge, the energy released by the discharge is used as explosive energy to remove workpiece material as particles. Examples of normal discharges include, but are not limited to, normal discharge with an ignition delay 210 and normal discharge without an ignition delay 220, examples of which are shown in FIG. 4. In an abnormal discharge, which includes an "arc" state or a "short-circuit" state of the discharge, a high amount of current may be generated, generating a high amount of energy. Most of the energy released in an abnormal discharge, however, is converted into excess heat energy that may damage the electrode 10 or the workpiece 14, and in some cases cause an undesirable deformation of the workpiece surface. Examples of abnormal discharges are shown, for example in FIG. 4, that include an arc with an ignition delay 230, an arc without an ignition delay 240, an arc and discharge combined 250 (a short circuit and a deformed wave pattern) among others. A threshold voltage $V_{th}$ is marked on FIG. 4, and a discharge voltage value greater than $V_{th}$ at the point of measurement (after a time delay $t_d$) indicates a normal discharge, whereas a discharge voltage value less than $V_{th}$ indicates an abnormal discharge. The threshold voltage value $V_{th}$ is chosen for differentiating between a normal and an abnormal discharge and may be determined experimentally for a particular electroerosion assembly setup. The threshold voltage value $V_{th}$ varies based on the machining conditions, for example the material being machined and the electrolyte employed. In one embodiment, the threshold voltage value $V_{th}$ is about 14.3 Volts. It is appreciated here that in FIG. 4, voltage level indicated by $V_{th}$ is indicative and not meant to be to scale.

Figure 3:
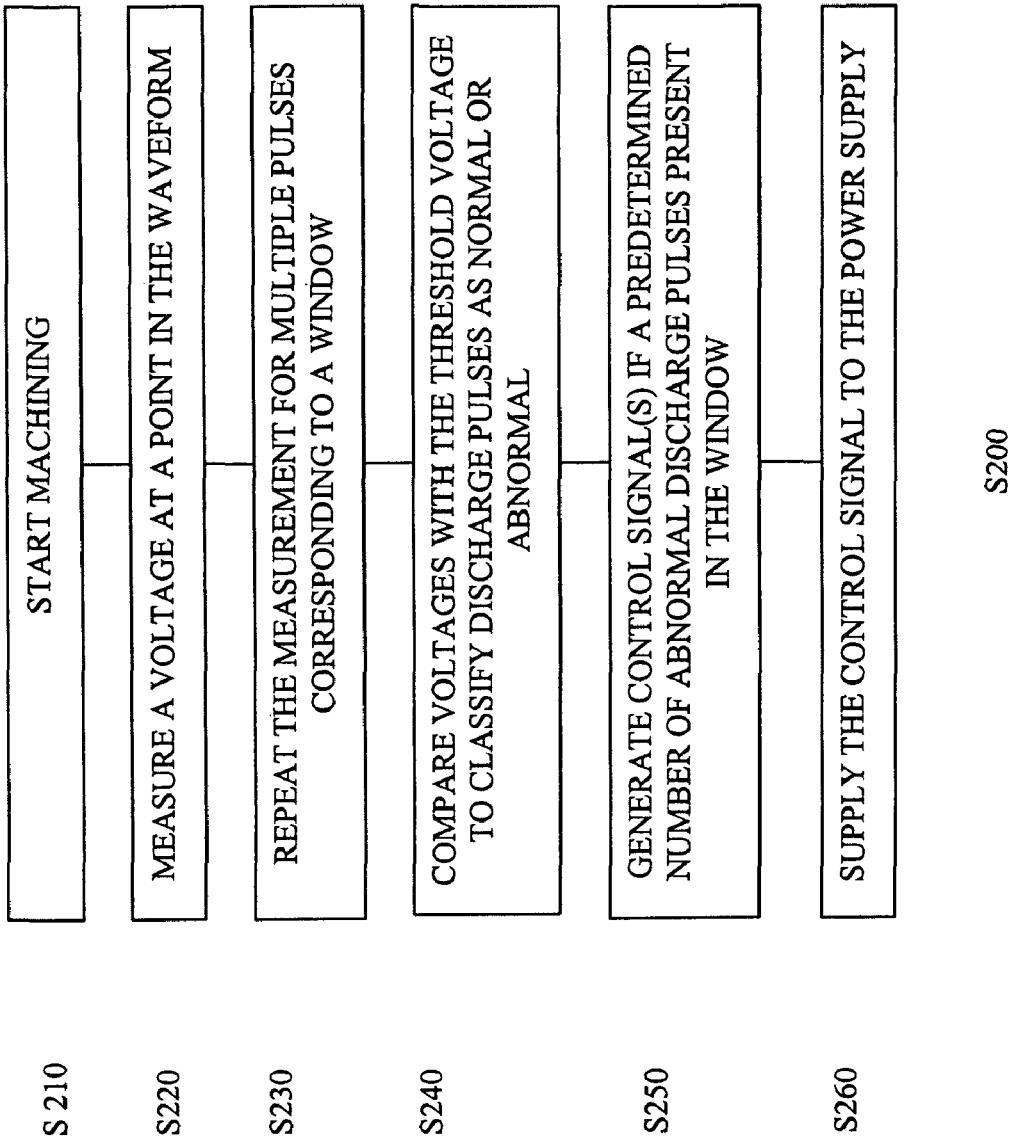
FIG. 3 illustrates a flow diagram of another method for monitoring and control machining using the electroerosion assembly.

A method S200 embodiment for monitoring machining in an electroerosion assembly is illustrated in FIG. 3. Once the machining is started (S210), a voltage is measured (S220) at a point after a specified time delay $t_d$, of at least half the applied pulse width $\Delta\tau$ from a pulse-on state of an applied pulse of the applied voltage waveform. The time delay $t_d$ may be varied, for example, to two-thirds of the applied pulse width $\Delta\tau$, and such variations are not limiting to the present invention. The measurement of the voltage as above is repeated (S230) for multiple pulses of the voltage waveform, each measurement being done after a specified time delay from a pulse-on state of applied pulses of the applied waveform. The multiple pulses being measured in S230 correspond to a window, which is a predetermined interval. In one embodiment, the window is a flying window. The multiple measured voltages corresponding to multiple pulses are then compared (S240) to at least one threshold voltage $V_{th}$ to classify each of the discharge pulses in the window as normal or abnormal. As discussed, the determination includes indicating the pulse as abnormal if the measured voltage for that pulse is less than $V_{th}$. If the comparison indicates a predetermined number of pulses in the window as abnormal, a control signal is generated (S250) to regulate at least one operating parameter of the power supply 20. In an example, the predetermined number of abnormal pulses required to generate a control signal is set to six (6). However, this number is only an example, and the window is not restricted to any specific number of pulses. The control signal, if generated, is supplied (S260) to the power supply.

The control signal is configured to employ any one or a combination of control strategies by regulating an operating parameter of the power supply 20, as also discussed earlier. It is noted here that a single pulse voltage measurement may be measured for generating a control signal. It is further noted that there may be multiple threshold voltage values for comparison, similar to $V_{th}$. For example, a second threshold value $V_{th2}$ (not illustrated in the figures) may be included, and a pulse is classified as abnormal if the measured voltage is greater than $V_{th2}$, and various such suitable voltage threshold values will occur to those skilled in the art, and do not limit the invention.

Use of the techniques and systems as above advantageously allows for a well-monitored and controlled machining process. Among other benefits, accidental damages to the workpiece, which at times may be irreversible or untreatable, are minimized, thereby reducing costs and in certain cases cycle times of manufacture of various components. The methods and systems as disclosed also provide an improved, online monitoring system for electroerosion processes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for monitoring machining in an electroerosion assembly having a power supply and at least one electrode arranged across a gap from a workpiece, the electrode being energized by the power supply that applies a potential difference $\Delta V$ between the electrode and the workpiece during a plurality of pulse-on periods, said method comprising:
    measuring a voltage at a point in a voltage waveform for the electroerosion assembly after a specified time delay $t_d$ of at least about one half of a pulse width $\Delta\tau$ of the voltage waveform;
    repeating the measurement for a plurality of pulses of the voltage waveform to obtain a plurality of voltages, each of the voltages corresponding to a point in respective ones of the pulses;
    averaging the voltages to obtain an average voltage;
    comparing the average voltage with at least one threshold voltage $V_{th}$, to determine whether the machining is in control;
    generating at least one control signal if the comparison indicates that the process is not in control, the at least one control signal being configured to regulate at least one operating parameter of the power supply; and
    supplying the at least one control signal to the power supply, if the control signal has been generated.

2. The method of claim 1, wherein the plurality of pulses corresponds to a window, and wherein the averaging comprises a point-by-point averaging, said method further comprising selecting a window size.

3. The method of claim 1, wherein the determining comprises indicating the machining is not in control if the average voltage is less than the at least one threshold voltage.

4. The method of claim 1, wherein the electroerosion assembly is a pulsed electroerosion assembly, wherein said measuring begins at the time delay interval $t_d$ after a pulse-on state and ends at a pulse-off state, and wherein the at least one control signal instructs the power supply to increase a duration of at least one pulse-off period.

5. The method of claim 1, wherein the electroerosion assembly is a pulsed electroerosion assembly, wherein said measuring begins at the time delay interval $t_d$ after a pulse-on state and ends at a pulse-off state, and wherein the at least one control signal instructs the power supply to decrease a duration of at least one of the pulse-on periods.

6. The method of claim 1, wherein the electroerosion assembly is a pulsed electroerosion assembly, wherein said measuring begins at the time delay interval $t_d$ after a pulse-on state and ends at a pulse-off state, and wherein the at least one control signal instructs the power supply to modify a peak current density provided to the electroerosion assembly.

7. The method of claim 1, wherein the electroerosion assembly is a pulsed electroerosion assembly, wherein said measuring begins at the time delay interval $t_d$ after a pulse-on state and ends at a pulse-off state, and wherein the at least one control signal instructs the power supply to turn off.

8. An electroerosion method for machining a workpiece comprising:
    a) energizing, using a power supply, at least one electrode of an electroerosion assembly by application of a potential difference $\Delta V$ between the electrode and the workpiece, the at least one electrode positioned in proximity to the workpiece, the electrode and the workpiece being separated by a gap;
    b) monitoring a voltage between the electrode and the workpiece, said monitoring comprising:
        measuring the voltage at a point in a voltage waveform for the electroerosion assembly after a specified time delay $t_d$ of at least about one half of a pulse width $\Delta\tau$ of the voltage waveform;
        repeating the measurement for a plurality of pulses of the voltage waveform to obtain a plurality of voltages, each of the voltages corresponding to a point in respective ones of the pulses;
        averaging the voltages to obtain an average voltage;
        comparing the average voltage with at least one threshold voltage $V_{th}$, to determine whether the machining is in control;
        generating at least one control signal if the comparison indicates that the process is not in control, the at least one control signal being configured to regulate at least one operating parameter of the power supply; and
        supplying the at least one control signal to the power supply, if the control signal has been generated.

9. The method of claim 8, wherein the determining comprises indicating the machining is not in control if the average voltage is less than the at least one threshold voltage.

10. The method of claim 8, wherein the electroerosion assembly is a pulsed electroerosion assembly, wherein said measuring begins at the time delay interval $t_d$ after a pulse-on state and ends at a pulse-off state, and wherein the at least one control signal instructs the power supply to increase a duration of at least one pulse-off period.

11. The method of claim 8, wherein the electroerosion assembly is a pulsed electroerosion assembly, wherein said measuring begins at the time delay interval $t_d$ after a pulse-on state and ends at a pulse-off state, and wherein the at least one control signal instructs the power supply to decrease a duration of at least one of the pulse-on periods.

12. The method of claim 8, wherein the electroerosion assembly is a pulsed electroerosion assembly, wherein said measuring begins at the time delay interval $t_d$ after a pulse-on state and ends at a pulse-off state, and wherein the at least one control signal instructs the power supply to modify a peak current density provided to the electroerosion assembly.

13. The method of claim 8, wherein the electroerosion assembly is a pulsed electroerosion assembly, wherein said measuring begins at the time delay interval $t_d$ after a pulse-on state and ends at a pulse-off state, and wherein the at least one control signal instructs the power supply to turn off.

* * * * *